United States Patent [19]

McKee

[11] Patent Number: 4,562,084

[45] Date of Patent: Dec. 31, 1985

[54] METHOD FOR FEEDING COOKIE PREFORMS

[75] Inventor: Harris B. McKee, Dallas, Tex.

[73] Assignee: Frito-Lay, Inc., Dallas, Tex.

[21] Appl. No.: 623,706

[22] Filed: Jun. 22, 1984

[51] Int. Cl.$^4$ .................... A21C 11/06; A21D 8/02
[52] U.S. Cl. .................... 426/502; 426/503; 83/620
[58] Field of Search ............ 426/503, 505, 502, 523

[56] References Cited

U.S. PATENT DOCUMENTS

| 3,427,910 | 2/1969 | Zempel | 426/503 |
| 3,512,990 | 5/1970 | Slaybaugh | 426/502 |
| 3,670,665 | 6/1972 | Levi | 426/502 |

OTHER PUBLICATIONS

Pyler, 1973, Baking Science and Technology, vol. 2, Siebel Publishing Company, Chicago, Ill., pp. 1122-1124.

*Primary Examiner*—R. Jones
*Assistant Examiner*—Carolyn Paden

[57] ABSTRACT

Cookie preforms are fed to a bakery oven in a manner which maximizes oven space and conveyor belt utilization by extruding a plurality of parallel ribbons of cookie dough extrudate onto a first conveyor belt, cutting the ribbons in a staggered pattern to form individual cookie preforms and feeding the preforms onto a second conveyor belt moving at a speed at least twice that of the first conveyor belt in order to separate successive preforms by at least the length of a cookie preform.

1 Claim, 3 Drawing Figures

METHOD FOR FEEDING COOKIE PREFORMS

BACKGROUND OF THE INVENTION

1. Field of the Invention

This invention relates to methods and equipment for feeding cookie preforms to an oven in commercial baking operations. More specifically, it relates to methods of feeding cookie preforms in a manner which maximizes oven space and conveyor belt utilization.

2. Prior Art

The production of cookies by commercial bakers is a highly automated process. Generally, cookie preforms to be baked are deposited onto a conveyor belt which travels through an oven, the residence time in the oven being calculated such that the cookie preforms are baked by the time they emerge from the oven on the conveyor belt. In order to maximize oven space and conveyor belt utilization, thereby minimizing energy consumption, it is desirable to place the cookie preforms on the conveyor belt as closely packed as possible, while still providing adequate space between the preforms to allow for expansion during baking.

Several methods have been employed to place cookie preforms onto a conveyor belt for feeding to an oven. In one method, a series of extruder dies are positioned next to each other above the conveyor belt and cookie dough is extruded downward through the dies. As the extrudate emerges from the dies, a wire cutter periodically passes across the die faces to cut a row of cookie preforms of desired thickness which drop onto the conveyor belt. The cookie preforms must be placed on the conveyor belt with their centers sufficiently spaced that expansion can take place without the cookies coming in contact. By depositing the cookie preforms in staggered rows, it is possible to place each row (in the direction of conveyor travel) closer to the adjacent row while maintaining the necessary distance between centers of the preforms. This staggered arrangement has been achieved using an "angled wire cut" machine in which the extruder and the dies are lined up at a 45° angle to the direction of conveyor travel and the wire cutter is passed across the die faces at a 45° angle to deposit the preforms in the desired pattern.

Unfortunately, the angled wire cut machine is rather expensive and mechanically complex which results in undesirably high maintenance costs. Moreover, the cookie feeding line using the angled wire cut machine takes up an undesirably large amount of floor space, due in part to the fact that the equipment cannot be arranged in-line with the conveyor. Accordingly, there is an unfilled need in the field for an efficient means of feeding cookie preforms to an oven which maximizes oven space and conveyor belt utilization.

SUMMARY OF THE INVENTION

This invention provides a method of feeding cookie preforms to a bakery oven which maximizes oven space and conveyor belt utilization. The method of this invention comprises: extruding onto a first conveyor belt moving in the direction of the oven a plurality of parallel ribbons of cookie dough extrudate, the distance between the edges of each adjacent ribbon being about equal to the amount of directional expansion of the cookie dough upon baking; cutting each ribbon in a direction perpendicular to the direction of ribbon travel to form individual cookie preforms as the ribbon progresses, the cuts in each ribbon being in phase with the cuts on alternating parallel ribbons and out of phase with the cuts on adjacent parallel ribbons by a distance of about one-half the length of a cookie preform; and feeding the individual cookie preforms from the first conveyor belt onto a second conveyor belt which moves toward and passes into the oven at a linear speed faster than that of the first conveyor belt, thereby forming parallel, staggered rows of individual cookie preforms. Preferably, each of the cookie preforms on the second conveyor belt is separated from the preceding and following cookie preforms by a distance of at least the length of a cookie preform.

There is also provided by the invention a cutting device which makes it possible to cut the ribbons of cookie dough extrudate into the staggered pattern. The device comprises a rigid elongate supporting member having a length at least about equal to the width of the conveyor belt; and a plurality of guillotine blades rigidly affixed along the length of said supporting member with the blade edges downwardly disposed, successive guillotine blades along the length of the supporting member being affixed to opposite sides of the supporting member to form two rows of blades.

The method and cutting device of this invention make it possible to feed individual cookie preforms to an oven in a highly efficient manner using a so-called "fig bar extruder". The fig bar extruder is less complex than the angle wire cut device used in the prior art and its use is more desirable inasmuch as the fig bar extruder can be arranged in-line with the conveyor belt, resulting in a more efficient utilization of space. Heretofore, the fig bar extruder has not been employed in the production of individual cookie preforms in a closely packed, staggered arrangement.

DESCRIPTION OF THE PREFERRED EMBODIMENTS

The method of this invention can be employed in conjunction with any conventional cookie dough which is capable of being extruded by a fig bar extruder. If desired, the extrudate may contain other materials, such as a filling material which can be injected into a hollow or concave portion of the extrudate cross-section as the dough emerges from the extrusion die. Fig bar extruders capable of extruding the dough in the proper consistency to be processed into cookie preforms are commercially available, for example, from Warner Lehara, Inc.

Figure 1:
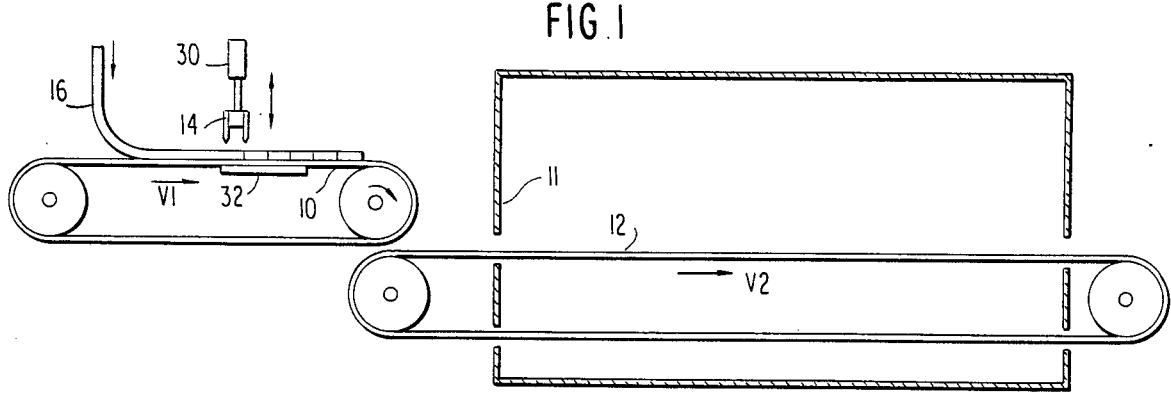
FIG. 1 is a schematic side view of a conveyor line used to feed cookie preforms to an oven by the process of the invention.
Figure 2:
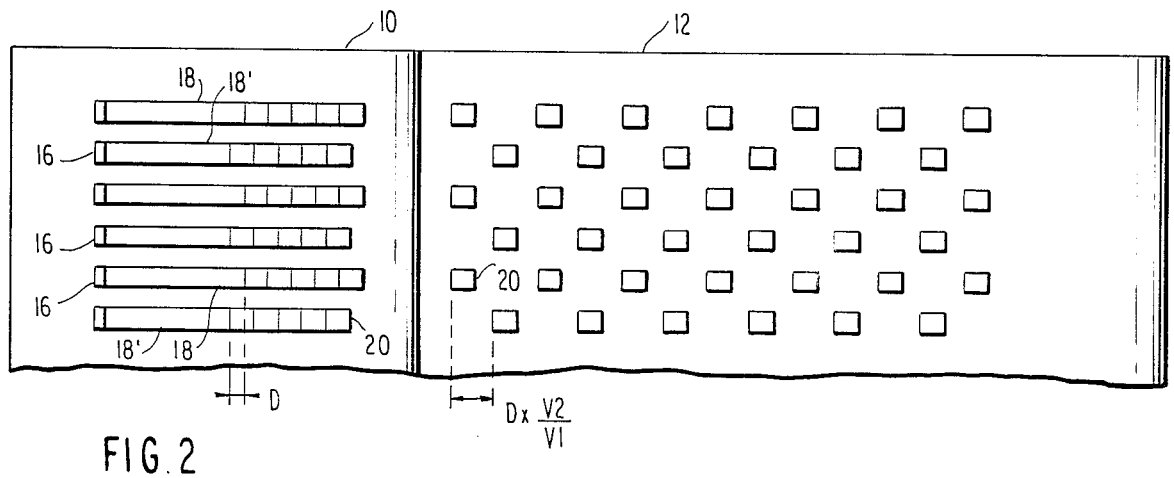
FIG. 2 is a schematic overhead view of a conveyor line used to feed cookie preforms to an oven by the process of the invention. Only a portion of the entire conveyor belt width is illustrated.

Referring to FIGS. 1 and 2, the cookie preform feeding line employed in the method of the invention comprises a first endless belt conveyor 10, a second endless belt conveyor 12 within an oven 11 and a cutting device 14.

In the practice of the invention, lines of cookie doughs 16 are extruded from one or more fig bar extruders (not shown) through a series of adjacent dies (not shown) to deposit a plurality of parallel ribbons 18, 18' of cookie dough extrudate onto the first conveyor belt 10 which is moving in the direction of the oven 11. Due to the staggered arrangement of the cookie preforms which is produced by the method of the invention, it is possible to deposit the ribbons closer together than would be possible with a non-staggered arrangement. The distance between the edges of adjacent ribbons 18 can be about equal to the amount of directional expansion of the cookie dough upon baking; that is, the amount of linear expansion in the direction perpendicular to the direction of travel is about equal to the distance between the edges.

The first conveyor belt 10 is a conventional endless belt type conveyor which is connected to drive means (not shown) capable of driving the conveyor belt 10 at the desired line speed.

As the ribbons 18, 18' of cookie dough extrudate progress along the first conveyor belt 10, they are cut in a direction perpendicular to the direction of ribbon travel to form individual cookie preforms 20. The cuts are placed such that the cuts in alternate ribbons 18' are in phase with each other and the cuts in adjacent ribbons 18 are out of phase with each other by a distance, D, of about one-half the length of a cookie preform 20, as shown in FIG. 2.

Figure 3:
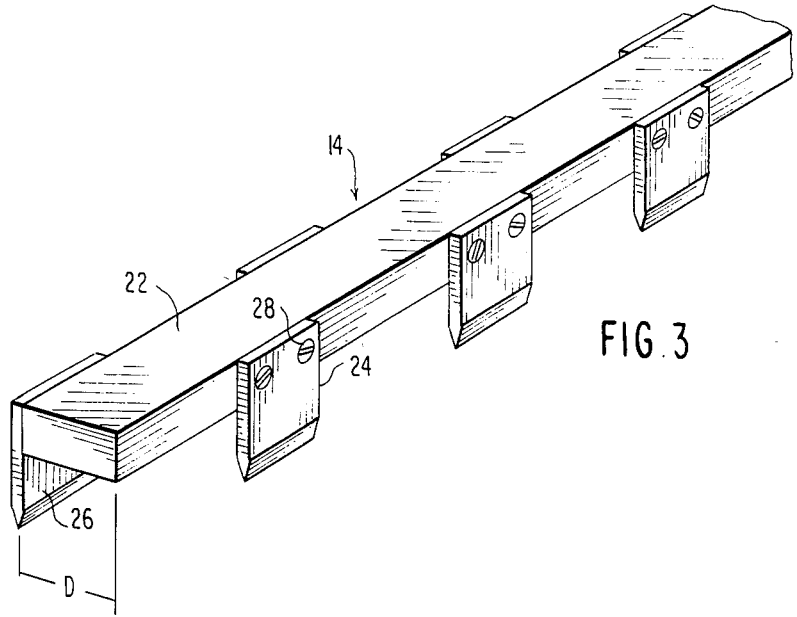
FIG. 3 is a perspective drawing of the cutting device showing the supporting member and affixed guillotine blades.

While any suitable means may be used to place the cuts in the ribbons 18, 18' in the desired pattern, it is preferred to employ the cutting device 14 illustrated in detail in FIG. 3. The cutting device 14 has a rigid elongate supporting member 22 of rectangular cross-section running through its center and having a length at least equal to the width of the conveyor belt 10. A plurality of guillotine blades 24, 26, equal in number to the number of cookie dough ribbons 18 to be cut, are rigidly affixed along the length of the supporting member 22, e.g., by means of bolts or machine screws 28 with the blade edges downwardly disposed, i.e., disposed toward the ribbons 18 of cookie dough. Each successive guillotine blade 24, 26 along the length of the supporting member 22 is affixed to the opposite side as the blade which precedes it and the blade which follows it. Two parallel rows of guillotine blades 24, 26 are thereby formed on either side of the supporting member 22. The edges of alternate guillotine blades 24, 26 are in line with each other and the edges of successive guillotine blades 24, 26 are parallel to each other and separated by the distance, D, i.e., about one-half the length of a cookie preform 20. The length of each blade edge is at least equal to the width of each ribbon 18, 18'. In order to prevent a single guillotine blade 24, 26 from simultaneously cutting adjacent ribbons 18, the length of the blade edge is less than the ribbon width plus the distance between the edges of adjacent ribbons 18, 18'.

The cutting device 14 is placed directly above the moving ribbons 18, 18' with the supporting member 22 perpendicular to the direction of ribbon travel, the blade edges preferably providing only a small clearance above the moving ribbons 18, 18'. The cutting device 14 is connected to a suitable drive device 30 for lowering and raising it in order to place the cuts in the ribbons 18, 18'. Any suitable mechanical or hydraulic means can be employed which can be timed synchronously with the movement of the first conveyor belt 10 to cause the cuts to be placed at the desired distances along the ribbons 18, 18'. A solid surface, such as a metal plate 32 can be placed under the first conveyor belt 10 at the point of impact of the cutting device 14 to provide support.

In operation, as each individual cookie preform 20 reaches the end of the first conveyor belt 10, it passes onto the second conveyor belt 12 which is moving toward the oven 11 at greater speed than the first conveyor belt 10. Due to the greater speed of the second conveyor belt 12, distance is introduced between successive cookie preforms 20 in each ribbon 18, 18'. There are thus formed parallel, staggered rows of individual cookie preforms 20, as shown in FIG. 2, which maximizes utilization of conveyor belt space. It will be appreciated that the distance between the cookie preforms on the second conveyor belt 12 will be $D \times V_2/V_1$, where D represents one-half the length of a cookie preform and $V_2$ and $V_1$, respectively, represent the line speeds of the second conveyor belt 12 and the first conveyor belt 10.

In order to prevent the cookies in adjacent rows from coming into contact with each other due to expansion which occurs upon baking, it is preferred that each cookie preform 20 on the second conveyor belt 12 be separated from the preceding and following preforms by a distance of at least one cookie and preferably not significantly greater than that length. Accordingly, the second conveyor belt 12 is preferably operated at a line speed of at least twice that of the first conveyor belt 10 in order to introduce the desired space between the cookie preforms 20.

The second conveyor belt 12 is a conventional endless belt type conveyor which is connected to drive means (not shown) capable of driving the second conveyor belt 12 at the desired speed. Preferably, the drive means for the first conveyor belt 10 and the second conveyor belt 12 are commonly controlled such that variations in line speed of the first conveyor belt 10 are automatically compensated for in the line speed of the second conveyor belt 12.

The cookie preforms 20 on the second conveyor belt 12 pass through the oven 11 where they are baked and then are subsequently cooled and removed from the conveyor belt or subjected to further processing in a conventional manner.

The benefits to be derived from the method and apparatus of the invention can be illustrated with reference to typical cookie preforms having a width of 2.25 inches which are produced using a fig bar extruder. The staggered arrangement which is made possible by the method and apparatus of the invention allows the centerline distance between adjacent ribbons of cookie dough extrudate to be reduced from about 2.5 inches to 2.25 inches and, in some instances, to as little as 1.92 inches. For a standard conveyor width of 39 inches (one meter), this results in an increase in the number of ribbons which can be placed on the conveyor from 15 to 18 or 20.

Since many modifications, variations and changes in detail may be made to the described embodiment, it is intended that all matter in the foregoing description and shown in the accompanying drawings be interpreted as illustrative and not in a limiting sense.

What is claimed is:

1. A method of feeding cookie preforms to a bakery oven via conveyor belts which maximizes oven space and conveyor belt utilization, the method comprising:
(a) extruding onto a first conveyor belt moving in the direction of said oven a plurality of parallel ribbons of cookie dough extrudate, the distance between the edges of each adjacent ribbon being about equal to the amount of directional expansion of the cookie dough upon baking;

(b) cutting each ribbon in a direction perpendicular to the direction of ribbon travel to form individual cookie preforms as the ribbon progresses, the cuts in each ribbon being in phase with the cuts on alternating parallel ribbons and out of phase with the cuts on adjacent parallel ribbons by a distance of about one-half the length of a cookie preform;

(c) feeding the individual cookie preforms from the first conveyor belt onto a second conveyor belt which moves toward and passes into the oven at a linear speed about twice that of the first conveyor belt, thereby separating each individual cookie preform from the preceding and following cookie preforms by a distance of about the length of one cookie preform, and thereby forming, in the direction of travel, parallel, staggered rows of individual cookie preforms on said second conveyor belt.

* * * * *